United States Patent
Lyu et al.

(10) Patent No.: US 11,506,963 B2
(45) Date of Patent: Nov. 22, 2022

(54) SYSTEMS FOR CONTROLLING LASER PROJECTOR AND MOBILE TERMINALS

(71) Applicant: GUANGDONG OPPO MOBILE TELECOMMUNICATIONS CORP., LTD., Guangdong (CN)

(72) Inventors: Xiangnan Lyu, Guangdong (CN); Jian Bai, Guangdong (CN); Biao Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 545 days.

(21) Appl. No.: 16/420,997

(22) Filed: May 23, 2019

(65) Prior Publication Data

US 2019/0369473 A1 Dec. 5, 2019

(30) Foreign Application Priority Data

May 30, 2018 (CN) .......................... 201810540684.2

(51) Int. Cl.
*G03B 21/20* (2006.01)
*G06T 7/521* (2017.01)
(Continued)

(52) U.S. Cl.
CPC ....... *G03B 21/2033* (2013.01); *G06F 1/1605* (2013.01); *G06F 1/3265* (2013.01); *G06T 7/521* (2017.01); *H04N 9/31* (2013.01)

(58) Field of Classification Search
CPC ...... G03B 21/00–64; H04N 9/31–3197; G06F 1/00–3296; G06T 7/00–97
See application file for complete search history.

(56) References Cited

U.S. PATENT DOCUMENTS

2003/0079163 A1* 4/2003 Hashimoto .......... G06F 11/079
714/55
2007/0171188 A1 7/2007 Waites
(Continued)

FOREIGN PATENT DOCUMENTS

CN 101409589 4/2009
CN 102042248 5/2011
(Continued)

OTHER PUBLICATIONS

IPI, Office Action for IN Application No. 201914021146, dated Mar. 1, 2021.
(Continued)

*Primary Examiner* — Christopher A Lamb, II
(74) *Attorney, Agent, or Firm* — Hodgson Russ LLP

(57) ABSTRACT

The present disclosure provides a mobile terminal and a system for controlling a laser projector. The system includes a first drive circuit, a second drive circuit, a watchdog timer, a microprocessor, and an application processor. The first drive circuit is configured to output an electrical signal to the laser projector. The second drive circuit is configured to supply power to the first drive circuit. The microprocessor is configured to send a first predetermined signal to the watchdog timer. The application processor is configured to send a second predetermined signal to the watchdog timer. The watchdog timer is configured to power off the second drive circuit, in response to that the watchdog timer does not read the first predetermined signal or the second predetermined signal.

18 Claims, 9 Drawing Sheets

(51) Int. Cl.
    *G06F 1/16* (2006.01)
    *G06F 1/3234* (2019.01)
    *H04N 9/31* (2006.01)

(56) References Cited

U.S. PATENT DOCUMENTS

| | | | |
|---|---|---|---|
| 2008/0246917 | A1 | 10/2008 | Phinney et al. |
| 2015/0257831 | A1* | 9/2015 | Srinivasan .......... A61N 5/0601 606/3 |
| 2018/0131160 | A1* | 5/2018 | Zhang .................... H01S 5/183 |

FOREIGN PATENT DOCUMENTS

| | | |
|---|---|---|
| CN | 104582125 | 4/2015 |
| CN | 105282303 | 1/2016 |
| CN | 205448962 | 8/2016 |
| CN | 106452599 | 2/2017 |
| CN | 106454287 | 2/2017 |
| CN | 107424187 | 12/2017 |
| CN | 107729836 | 2/2018 |
| CN | 108539576 | 9/2018 |
| JP | H0612293 A | 1/1994 |
| JP | 2002016315 A | 1/2002 |
| JP | 2003131906 A | 5/2003 |
| JP | 2006186168 A | 7/2006 |

OTHER PUBLICATIONS

EPO, Communication for EP Application No. 19176884.5, dated Feb. 17, 2021.
WIPO, English Translation of ISR/WO for PCT/CN2019/077658, dated May 29, 2019.
IP Australia, Office Action for AU Application No. 2019277762, May 17, 2021.
SIPO, First Office Action for CN Application No. 201810540684, dated Apr. 1, 2019.
EPO, Office Action for EP Application No. 19176884.5, dated Oct. 28, 2019.
IPA, Office Action for AU Application No. 2019277762, dated Aug. 23, 2021.
EPO, Communication for EP Application No. 19176884.5, dated Oct. 6, 2021.
KIPO, Office Action for KR Application No. 10-2020-7035190, dated Nov. 10, 2021.
IPA, Examination Report issued for AU Application No. 2019277762, dated Dec. 20, 2021.
JPO, Notice of Reasons for Refusal issued for JP Application No. 2020-565978, dated Dec. 3, 2021.

* cited by examiner

SYSTEMS FOR CONTROLLING LASER PROJECTOR AND MOBILE TERMINALS

CROSS REFERENCE TO RELATED APPLICATION

This application claims priority to Chinese Patent Application No. 201810540684.2, filed May 30, 2018, the entire disclosure of which is incorporated herein by reference.

TECHNICAL FIELD

The present disclosure relates to the field of consumer electronics technologies, and more particularly, to a system for controlling a laser projector, and a mobile terminal.

BACKGROUND

A mobile phone may be equipped with a laser generator for emitting laser light outward. However, when the mobile phone fails and crashes, the laser generator may continue to emit the laser light outward for a long period of time, and the laser light emitted for the long period of time is likely to harm the user, especially the user's eyes.

SUMMARY

Embodiments of the present disclosure provide a system for controlling a laser projector, and a mobile terminal.

The system for controlling the laser projector provided in the embodiments of the present disclosure includes: a first drive circuit, a second drive circuit, a watchdog timer, a microprocessor and an application processor. The first drive circuit is coupled to the laser projector. The first drive circuit is configured to output an electrical signal to drive the laser projector to project laser light. The second drive circuit is coupled to the first drive circuit. The second drive circuit is configured to supply power to the first drive circuit. The watchdog timer is coupled to the second drive circuit. The microprocessor is coupled to the watchdog timer and configured to send a first predetermined signal to the watchdog timer. The application processor is coupled to the watchdog timer and configured to send a second predetermined signal to the watchdog timer. The watchdog timer is configured to power off the second drive circuit to power off the first drive circuit and the laser projector, in response to that the watchdog timer does not read the first predetermined signal or the second predetermined signal.

The mobile terminal provided in the embodiments of the present disclosure includes a laser projector and a system for controlling the laser projector. The system includes: a first drive circuit, a second drive circuit, a watchdog timer, a microprocessor and an application processor. The first drive circuit is coupled to the laser projector. The first drive circuit is configured to output an electrical signal to drive the laser projector to project laser light. The second drive circuit is coupled to the first drive circuit. The second drive circuit is configured to supply power to the first drive circuit. The watchdog timer is coupled to the second drive circuit. The microprocessor is coupled to the watchdog timer and configured to send a first predetermined signal to the watchdog timer. The application processor is coupled to the watchdog timer and configured to send a second predetermined signal to the watchdog timer. The watchdog timer is configured to power off the second drive circuit to power off the first drive circuit and the laser projector, in response to that the watchdog timer does not read the first predetermined signal or the second predetermined signal.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
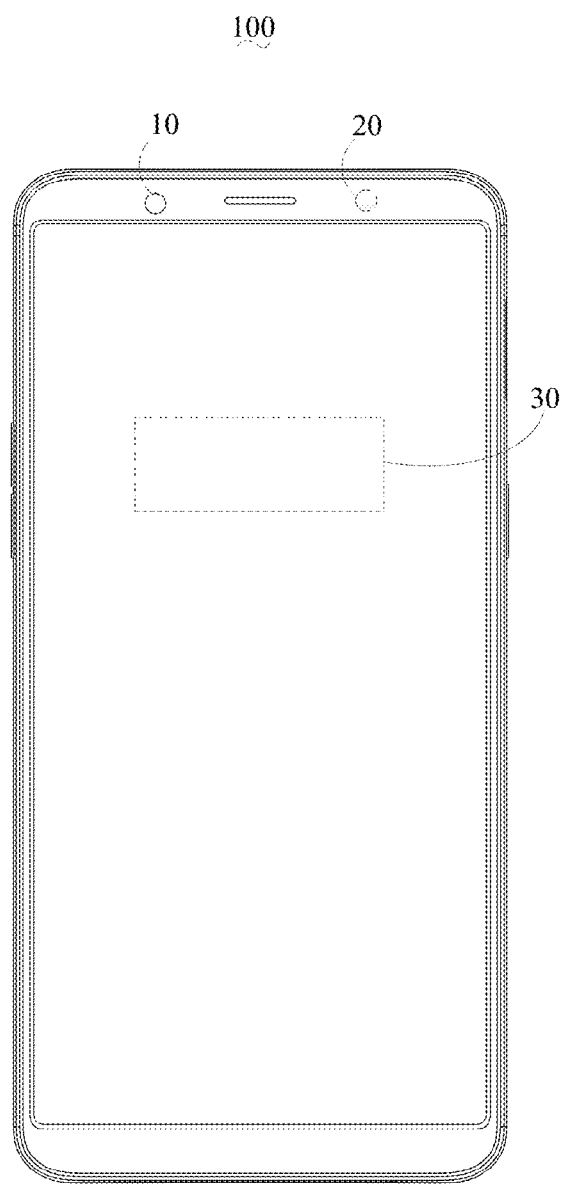
FIG. 1 illustrates a schematic diagram of a mobile terminal according to some embodiments of the present disclosure.

Reference will be made in detail to embodiments of the present disclosure with reference to drawings. The same or similar elements and the elements having same or similar functions are denoted by like reference numerals in the drawings throughout the descriptions.

The embodiments described herein with reference to the drawings are explanatory, illustrative, and used to generally understand the present disclosure. In addition, the embodiments shall not be construed to limit the present disclosure.

In the present disclosure, unless specified or limited otherwise, the first feature is "on" or "under" the second feature refers to the first feature and the second feature can be direct or via media indirect mountings, connections, and couplings. And, the first feature is "on", "above", "over" the second feature may refer to the first feature is right over the second feature or is diagonal above the second feature, or just refer to the horizontal height of the first feature is higher than the horizontal height of the second feature. The first feature is "below" or "under" the second feature may refer to the first feature is right over the second feature or is diagonal under the second feature, or just refer to the horizontal height of the first feature is lower than the horizontal height of the second feature.

Figure 2:
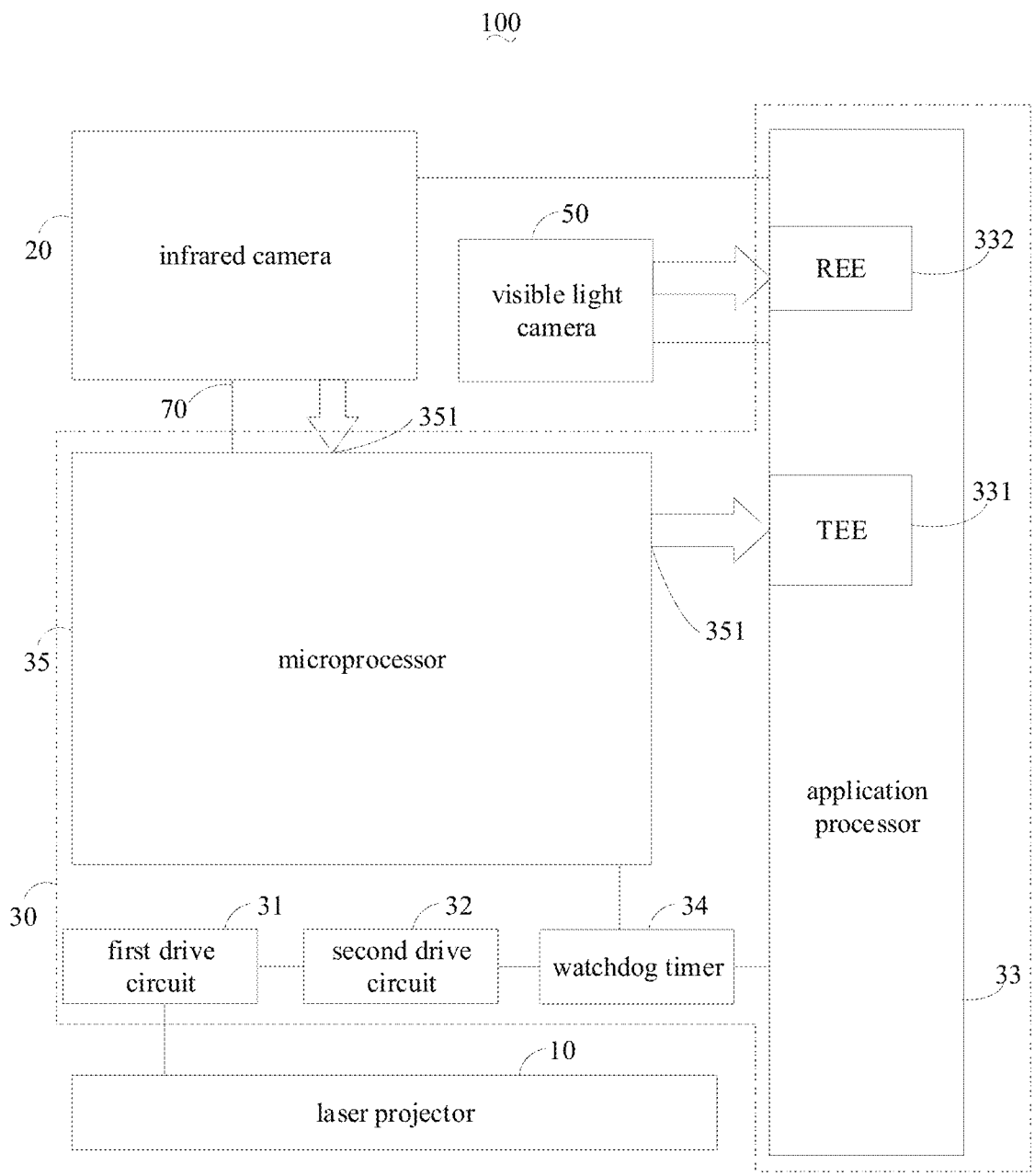
FIG. 2 illustrates a block diagram of a mobile terminal according to some embodiments of the present disclosure.

Referring to FIG. 1 and FIG. 2, a system 30 for controlling a laser projector 10 provided in an embodiment of the present disclosure includes a first drive circuit 31, a second drive circuit 32, a watchdog timer 34, a microprocessor 35 and an application processor 33. The first drive circuit 31 is coupled to the laser projector 10. The first drive circuit 31 is configured to output an electrical signal to drive the laser projector 10 to project laser light. The second drive circuit 32 is coupled to the first drive circuit 31. The second drive circuit 32 is configured to supply power to the first drive circuit 31. The watchdog timer 34 is coupled to the second drive circuit 32. The microprocessor 35 is coupled to the watchdog timer 34 and configured to send a first predetermined signal to the watchdog timer 34. The application processor 33 is coupled to the watchdog timer 34 and configured to send a second predetermined signal to the watchdog timer 34. The watchdog timer 34 is configured to power off the second drive circuit 32 to power off the first drive circuit 31 and the laser projector 10, in response to that the watchdog timer 34 does not read the first predetermined signal or the second predetermined signal.

Referring to FIG. 1 and FIG. 2, a mobile terminal 100 provided in an embodiment of the present disclosure includes a laser projector 10 and a system 30 for controlling the laser projector 10. The system 30 includes a first drive circuit 31, a second drive circuit 32, a watchdog timer 34, a microprocessor 35 and an application processor 33. The first drive circuit 31 is coupled to the laser projector 10. The first drive circuit 31 is configured to output an electrical signal to drive the laser projector 10 to project laser light. The second drive circuit 32 is coupled to the first drive circuit 31. The second drive circuit 32 is configured to supply power to the first drive circuit 31. The watchdog timer 34 is coupled to the second drive circuit 32. The microprocessor 35 is coupled to the watchdog timer 34 and configured to send a first predetermined signal to the watchdog timer 34. The application processor 33 is coupled to the watchdog timer 34 and configured to send a second predetermined signal to the watchdog timer 34. The watchdog timer 34 is configured to power off the second drive circuit 32 to power off the first drive circuit 31 and the laser projector 10, in response to that the watchdog timer 34 does not read the first predetermined signal or the second predetermined signal.

In the mobile terminal 100 and the system 30 provided in the embodiments of the present disclosure, when the watchdog timer 34 does not read the first predetermined signal or the second predetermined signal, it may be determined that the microprocessor 35 is malfunctioning or the application processor 33 is malfunctioning. At this time, the watchdog timer 34 may power off the second drive circuit 32 to power off the first drive circuit 31 and the laser projector 10 to prevent the laser projector 10 from continuously emitting laser light outward to damage the user.

Referring to FIG. 1 and FIG. 2, a mobile terminal 100 provided in an embodiment of the present disclosure includes a laser projector 10, an infrared camera 20 and a system 30 for controlling the laser projector 10. The mobile terminal 100 may be a mobile phone, a tablet computer, a smart watch, a smart wristband, a smart wearable device, etc. In the embodiments of the present disclosure, an example of the mobile terminal 100 is the mobile phone, and the specific form of the mobile terminal 100 may be not limited to the mobile phone.

The laser projector 10 is capable of projecting laser light to a target object. The laser light may be infrared light. The laser light projected by the laser projector 10 may be a pattern with specific speckles or streaks. The infrared camera 20 is capable of collecting an infrared image of the target object, or receiving a laser pattern modulated by the target object. In order to obtain a clearer laser pattern, it is usually necessary to continuously emit a plurality of frames of laser light to the target object with a certain optical power. However, if the laser projector 10 continuously emits laser light outward, the laser light may burn the user, especially to the user's eyes. Therefore, it is necessary to prevent the laser projector 10 from continuously emitting laser light outward.

The system 30 includes a first drive circuit 31, a second drive circuit 32, an application processor 33, a watchdog timer 34 and a microprocessor 35.

The first drive circuit 31 is coupled to the laser projector 10. The first drive circuit 31 is configured to output an electrical signal to the laser projector 10, to drive the laser projector 10 to project laser light. In detail, the first drive circuit 31 serves as a current source of the laser projector 10. If the first drive circuit 31 is powered off, the laser projector 10 cannot emit laser light outward; or, the first drive circuit 31 stops outputting the electric signal to the laser projector 10, the laser projector 10 cannot emit laser light outward. The second drive circuit 32 is coupled to the first drive circuit 31. The second drive circuit 32 is configured to supply power to the first drive circuit 31. For example, the first drive circuit 31 may be a DC/DC circuit. The first drive circuit 31 may be separately packaged as a drive chip, and the second drive circuit 32 may be separately packaged as a drive chip, or the first drive circuit 31 and the second drive circuit 32 may be packaged together in one drive chip. The drive chips all may be disposed on a substrate or a circuit board of the laser projector 10.

The watchdog timer 34 is directly coupled to the second drive circuit 32. The watchdog timer 34 may control an operation of the second drive circuit 32. In detail, the watchdog timer 34 may control the second drive circuit 32 to power on, power off, power on for a preset duration, power off for a preset duration, output a voltage with a preset value, and the like.

The microprocessor 35 is directly coupled to the watchdog timer 34 and the infrared camera 20. The microprocessor 35 may be a processing chip. The microprocessor 35 is configured to send the first predetermined signal periodically to the watchdog timer 34. For example, the microprocessor 35 may send the first predetermined signal to the watchdog timer 34 every 50 milliseconds. The period (time interval) of sending the first predetermined signal by the microprocessor 35 is the first period. The watchdog timer 34 may receive the first predetermined signal from the microprocessor 35. The first predetermined signal may include a signal indicating an operation state of the microprocessor 35. At this time, the watchdog timer 34 may determine whether the microprocessor 35 has an operation failure according to the first predetermined signal. The first predetermined signal may further include a signal controlling the first drive circuit 31 and the laser projector 32 to operate. For example, the watchdog timer 34 may control the laser projector 10 to power on or off based on the first predetermined signal, or control the intensity, duration and the like of the laser light emitted by the laser projector 10.

The first period is within a range of [50, 150] milliseconds. In detail, the first period may be set to 50 milliseconds, 62 milliseconds, 75 milliseconds, 97 milliseconds, 125 milliseconds, 150 milliseconds and any duration within the above range. It should be understood that if the first period is set too short, the microprocessor 35 is required to send the first predetermined signal too frequently, which may occupy too much processing space of the microprocessor 35 and cause the mobile terminal 100 to jam easily. If the first period is set too long, the failure of the microprocessor 35 cannot be detected in time, that is, the laser projector 10 cannot be powered off in time, which is disadvantageous for the safe use of the laser projector 10. By setting the first period within the range of [50, 150] milliseconds, it is possible to better balance the fluency and security of the mobile terminal 100. The first period may be set when the mobile terminal 100 leaves factory, or may be customized according to the user of the mobile terminal 100.

The microprocessor 35 may be coupled to the infrared camera 20 through an Inter-Integrated Circuit (I2C) bus 70. The microprocessor 35 may provide the infrared camera 20 with clock information for collecting infrared images and laser patterns. The infrared images and laser patterns collected by the infrared camera 20 may be sent to the microprocessor 35 through a Mobile Industry Processor Interface (MIPI) 351.

The application processor 33 may server as a system of the mobile terminal 100. The application processor 33 is directly coupled to the watchdog timer 34. The application processor 33 may also be coupled to the infrared camera 20 and a visible light camera 50. The application processor 33 is configured to send the second predetermined signal periodically to the watchdog timer 34. For example, the application processor 33 may send the second predetermined signal to the watchdog timer 34 every 50 milliseconds. The period (time interval) of sending the second predetermined signal by the application processor 33 is the second period. The watchdog timer 34 may receive the second predetermined signal from the application processor 33. The second predetermined signal may include a signal indicating an operation state of the application processor 33. At this time, the watchdog timer 34 may determine whether the application processor 33 has an operation failure according to the second predetermined signal. The second predetermined signal may further include a signal controlling the first drive circuit 31 and the laser projector 32 to operate. For example, the watchdog timer 34 may control the laser projector 10 to power on or off based on the second predetermined signal, or control the intensity, duration and the like of the laser light emitted by the laser projector 10.

The second period is within a range of [50, 150] milliseconds. In detail, the second period may be set to 50 milliseconds, 62 milliseconds, 75 milliseconds, 97 milliseconds, 125 milliseconds, 150 milliseconds and any duration within the above range. It should be understood that if the second period is set too short, the application processor 33 is required to send the second predetermined signal too frequently, which may occupy too much processing space of the application processor 33 and cause the mobile terminal 100 to jam easily. If the second period is set too long, the failure of the application processor 33 cannot be detected in time, that is, the laser projector 10 cannot be powered off in time, which is disadvantageous for the safe use of the laser projector 10. By setting the second period within the range of [50, 150] milliseconds, it is possible to better balance the fluency and security of the mobile terminal 100. The second period may be set when the mobile terminal 100 leaves factory, or may be customized according to the user of the mobile terminal 100.

The microprocessor 35 may be coupled to the application processor 33 through the MIPI 351. In detail, the microprocessor 35 is coupled to a Trusted Execution Environment (TEE) 331 of the application processor 33 through the MIPI 351, to transfer data in the microprocessor 35 directly to the TEE 331. The code and the memory area in the TEE 331 are both controlled by an access control unit and cannot be accessed by the program in the Rich Execution Environment (REE) 332. The TEE 331 and the REE 332 may all be formed in the application processor 33.

In an embodiment, an infrared template and a depth template for verifying an identity may be stored in the TEE 331. The infrared template may be a face infrared image input by the user in advance. The depth template may be a face depth image input by the user in advance. The infrared template and the depth template are stored in the TEE 331, which are not easily falsified and stolen, such that the information in the mobile terminal 100 is relatively secure.

When the user needs to verify the identity, the microprocessor 35 controls the infrared camera 20 to collect an infrared image of the user, and sends the collected infrared image to the TEE 331 of the application processor 33. The collected infrared image is compared with the infrared template in the TEE 331 by the application processor 33. If the two matches, a result that the verification based on the infrared template passes is output. In the process of matching whether the infrared image and the infrared template, the infrared image and the infrared template cannot be obtained, falsified or stolen by other programs, thereby improving the information security of the mobile terminal 100.

Furthermore, the microprocessor 35 may control the first drive circuit 31 to drive the laser projector 10 to project laser light outward through the watchdog timer 34 and the second drive circuit 32, and control the infrared camera 20 to collect the laser pattern modulated by the target object. The microprocessor 35 obtains and processes the laser pattern to get a depth image. The depth image is sent to the TEE 331 of the application processor 33. The application processor 33 compares the depth image with the depth template in the TEE 331. If the two matches, a result that the verification based on the depth template passes is output. In the process of matching whether the depth image and the depth template, the depth image and the depth template cannot be obtained, falsified or stolen by other programs, thereby improving the information security of the mobile terminal 100.

The application processor 33 may also be coupled to a plurality of electronic components of the mobile terminal 100 and control the plurality of electronic components to operate in predetermined modes. For example, a display screen of the mobile terminal 100 is controlled to display predetermined frames, an antenna of the mobile terminal 100 is controlled to transmit or receive predetermined data, the visible light camera 50 of the mobile terminal 100 is controlled to obtain a color image and to process the color image, the power of the infrared camera 20 is controlled to power on or off, the infrared camera 20 is controlled to power down or to reset, and the like.

When the microprocessor 35 is malfunctioning, for example, when the microprocessor 35 is down, the first drive circuit 31 may be in a state of continuously driving the laser projector 10 to emit laser light outward, and the laser light emitted continuously outward by the laser projector 10 may damage the user. Therefore, it is necessary to monitor an operating state of the microprocessor 35, and to power off the laser projector 10 in time when the microprocessor 35 is malfunctioning. In the embodiments of the present disclosure, the watchdog timer 34 may power off the first drive circuit 31 and the laser projector 10 through powering off the second drive circuit 32. The system 30 provided in the present embodiment may determine whether the microprocessor 35 has an operation failure by the microprocessor 35 sending the first predetermined signal to the watchdog timer 34 each first period, such as, a clear signal is sent to the watchdog timer 34 every 50 milliseconds. When the microprocessor 35 is malfunctioning, the microprocessor 35 cannot run the program for sending the first predetermined signal to the watchdog timer 34. At this time, the watchdog timer 34 cannot obtain the first predetermined signal within the first period. That is, the system 30 may determine whether the microprocessor 35 is in an operation fault state based on whether the watchdog timer 34 receive the first predetermined signal within the first period. The watchdog timer 34 may power off the second drive circuit 32 to power off the first drive circuit 31 and the laser projector 10 when the first predetermined signal is not received within the first period.

When the application processor 33 is malfunctioning, for example, when the application processor 33 is down, the first drive circuit 31 may be in a state of continuously driving the laser projector 10 to emit laser light outward, and the laser light emitted continuously outward by the laser projector 10 may damage the user. Therefore, it is necessary to monitor an operating state of the application processor 33, and to power off the laser projector 10 in time when the application processor 33 is malfunctioning. In the embodiments of the present disclosure, the watchdog timer 34 may power off the first drive circuit 31 and the laser projector 10 through powering off the second drive circuit 32. The system 30 provided in the present embodiment may determine whether the application processor 33 has an operation failure by the application processor 33 sending the second predetermined signal to the watchdog timer 34 each second period, such as, a clear signal is sent to the watchdog timer 34 every 50 milliseconds. When the application processor 33 is malfunctioning, the application processor 33 cannot run the program for sending the second predetermined signal to the watchdog timer 34. At this time, the watchdog timer 34 cannot obtain the second predetermined signal within the second period. That is, the system 30 may determine whether the application processor 33 is in an operation fault state based on whether the watchdog timer 34 receive the second predetermined signal within the second period. The watchdog timer 34 may power off the second drive circuit 32 to power off the first drive circuit 31 and the laser projector 10 when the second predetermined signal is not received within the second period.

In detail, in some embodiments of the present disclosure, a specific form of the watchdog timer 34 may be a counter. There may be one or two counters. When there are two counters, one counter may count down from a number at a certain speed after receiving the first predetermined signal, and a time interval from a starting time point of counting down to a time point of counting down to 0 is the first period. If the microprocessor 35 is operating normally, the microprocessor 35 may resend the first predetermined signal before the number is counted down to 0. The watchdog timer 34 resets the number for counting down again after receiving the first predetermined signal. If the microprocessor 35 is not operating normally, when the watchdog timer 34 counts down the number to 0, the microprocessor 35 does not send the first predetermined signal to the watchdog timer 34 (i.e., the watchdog timer 34 does not receive the first predetermined signal). The watchdog timer 34 is deemed to determine that the microprocessor 35 is malfunctioning. The watchdog timer 34 issues a signal to power off the second drive circuit 32 to power off the first drive circuit 31 and the laser projector 10.

The other counter may count down from a number at a certain speed after receiving the second predetermined signal, and a time interval from a starting time point of counting down to a time point of counting down to 0 is the second period. If the application processor 33 is operating normally, the application processor 33 may resend the second predetermined signal before the number is counted down to 0. The watchdog timer 34 resets the number for counting down again after receiving the second predetermined signal. If the application processor 33 is not operating normally, when the watchdog timer 34 counts down the number to 0, the application processor 33 does not send the second predetermined signal to the watchdog timer 34 (i.e., the watchdog timer 34 does not receive the second predetermined signal). The watchdog timer 34 is deemed to determine that the application processor 33 is malfunctioning. The watchdog timer 34 issues a signal to power off the second drive circuit 32 to power off the first drive circuit 31 and the laser projector 10. When there is one counter, the counter may receive the first predetermined signal and the second predetermined signal in a time-sharing manner, or may receive the first predetermined signal and the second predetermined signal simultaneously. At this time, the counter may distinguish the first predetermined signal and the second predetermined signal.

In one example, the watchdog timer 34 may be external to the application processor 33. The watchdog timer 34 may be an external timer chip. The watchdog timer 34 may be coupled to an I/O (Input/Output) of the microprocessor 35 to receive the first predetermined signal from the microprocessor 35. The watchdog timer 34 may be coupled to an I/O of the application processor 33 to receive the second predetermined signal from the application processor 33. The reliability of the external watchdog timer 34 is high. In another example, the watchdog timer 34 may be integrated within the application processor 33, and the functionality of the watchdog timer 34 may be implemented by an internal timer of the application processor 33, and the I/O of the microprocessor 35 is coupled to a pin corresponding to the watchdog timer 34, which simplifies a hardware circuit design of the system 30.

In summary, in the mobile terminal 100 and the system 30 provided in the embodiments of the present disclosure, the watchdog timer 34 determines that the microprocessor 35 or the application processor 33 is malfunctioning when the watchdog timer 34 does not read the first predetermined signal or the second predetermined signal. At this time, the watchdog timer 34 powers off the second drive circuit 32 to power off the first drive circuit 31 and the laser projector 10, thereby preventing the laser projector 10 from continuously emitting laser light outward to damage the user.

Referring to FIG. 2, in some embodiments, the watchdog timer 34 is configured to send a reset signal for restarting the microprocessor 35 to the application processor 33, in response to that the watchdog timer 34 does not receive the first predetermined signal within the first period.

As described above, when the watchdog timer 34 does not receive the first predetermined signal within the first period, the microprocessor 35 is in a fault state. At this time, the watchdog timer 34 is directly coupled to a control interface (including an interface for restarting the microprocessor 35) of the microprocessor 35, the watchdog timer 34 may send the reset signal for restarting the microprocessor 35 to enable the microprocessor 35 to be restarted, so as to operate normally. After the microprocessor 35 is restarted, the microprocessor 35 may operate normally, and send the first predetermined signal to the watchdog timer 34. At this time, if the application processor 33 may also operate normally, the application processor 33 may also send the second predetermined signal to the watchdog timer 34. Therefore, the microprocessor 35 and the application processor 33 may control the laser projector 10 to operate normally by the watchdog timer 34, so as to prevent the laser projector 10 from continuously emitting laser light outward to damage the user.

Figure 3:
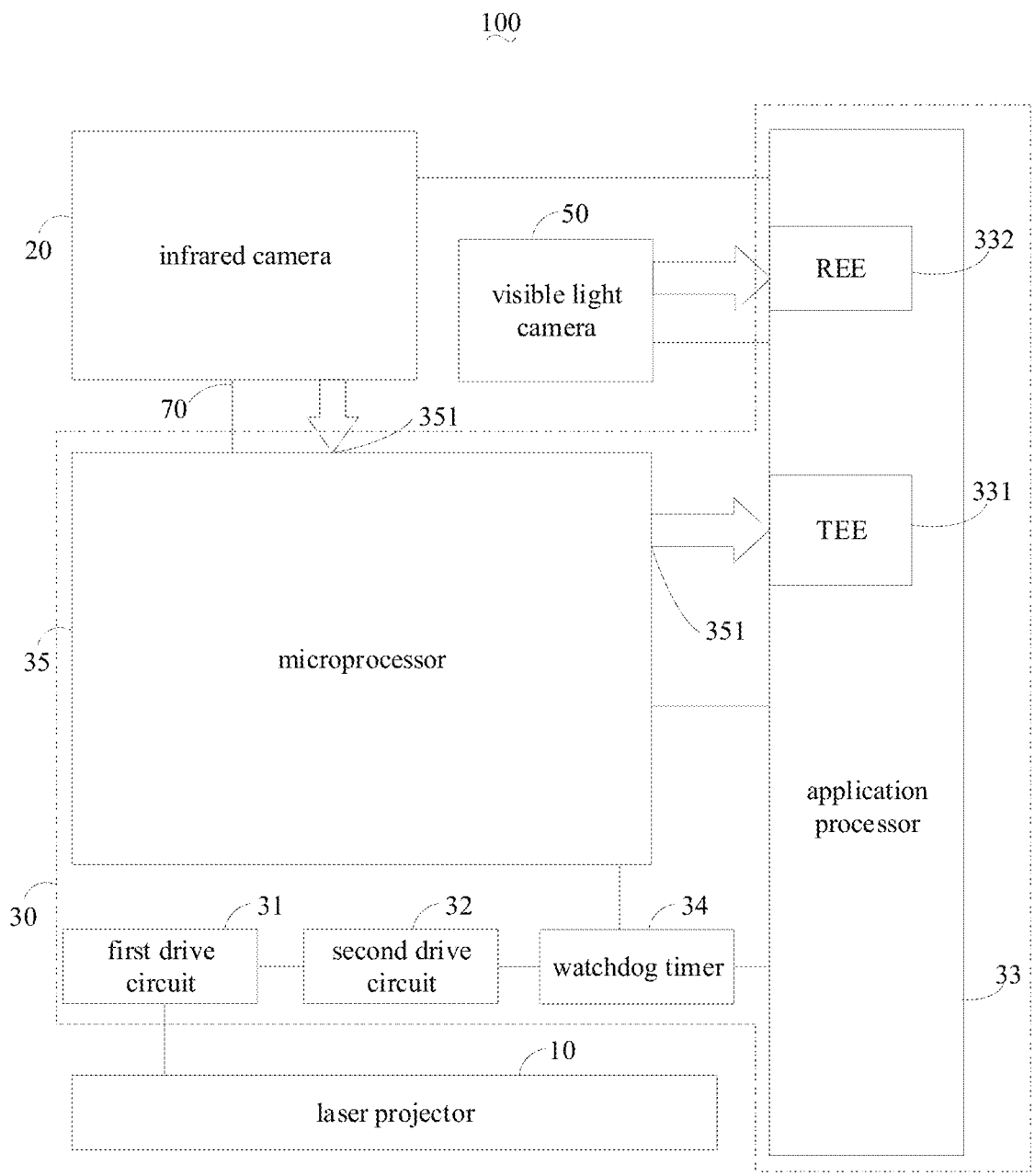
FIG. 3 illustrates a block diagram of a mobile terminal according to some embodiments of the present disclosure.

Referring to FIG. 3, in some embodiments, the application processor 33 is also directly coupled to a control interface (including an interface for restarting the microprocessor 35) of the microprocessor 35. When the watchdog timer 34 does not receive the first predetermined signal within the first period, the watchdog timer 34 may send the reset signal for restarting the microprocessor 35 to the application processor 33. At this time, the application processor 33 may send the reset signal for restarting the microprocessor 35 to the microprocessor 35 to restart the microprocessor 35.

The microprocessor 35 is directly coupled to the application processor 33 to enable the application processor 33 to reset, wake, and debug the microprocessor 35. After the microprocessor 35 is restarted, the microprocessor 35 may operate normally and send the first predetermined signal to the watchdog timer 34. At this time, if the application processor 33 also operate normally, the application processor 33 may also send the second predetermined signal to the watchdog timer 34. Therefore, the microprocessor 35 and the application processor 33 may control the laser projector 10 to operate normally by the watchdog timer 34, so as to prevent the laser projector 10 from continuously emitting laser light outward to damage the user.

Referring to FIG. 2, in some embodiments, the watchdog timer 34 is configured to send a reset signal for restarting the application processor 33, in response to that the watchdog timer 34 does not receive the second predetermined signal within the second period.

In detail, in one example, the reset signal for restarting the application processor 33 may be directly received by the application processor 33. At this time, the watchdog timer 34 is directly coupled to a control interface (including an interface for restarting the application processor 33) of the application processor 33. The reset signal has a higher level in the execution program of the application processor 33, and the application processor 33 may preferentially respond to the reset signal to reset. In another example, the reset signal for restarting the application processor 33 may also be sent to a reset chip external to the application processor 33, which forces the application processor 33 to reset in response to the reset signal.

As described above, when the watchdog timer 34 does not receive the second predetermined signal within the second period, the application processor 33 is in a fault state. At this time, the watchdog timer 34 may send the reset signal for restarting the application processor 33 to enable the application processor 33 to be restarted, so as to operate normally. After the application processor 33 is restarted, the application processor 33 may operate normally, and send the second predetermined signal to the watchdog timer 34. At this time, if the microprocessor 35 may also operate normally, the microprocessor 35 may also send the first predetermined signal to the watchdog timer 34. Therefore, the microprocessor 35 and the application processor 33 may control the laser projector 10 to operate normally by the watchdog timer 34 to prevent the laser projector 10 from continuously emitting laser light outward to damage the user.

Figure 4:
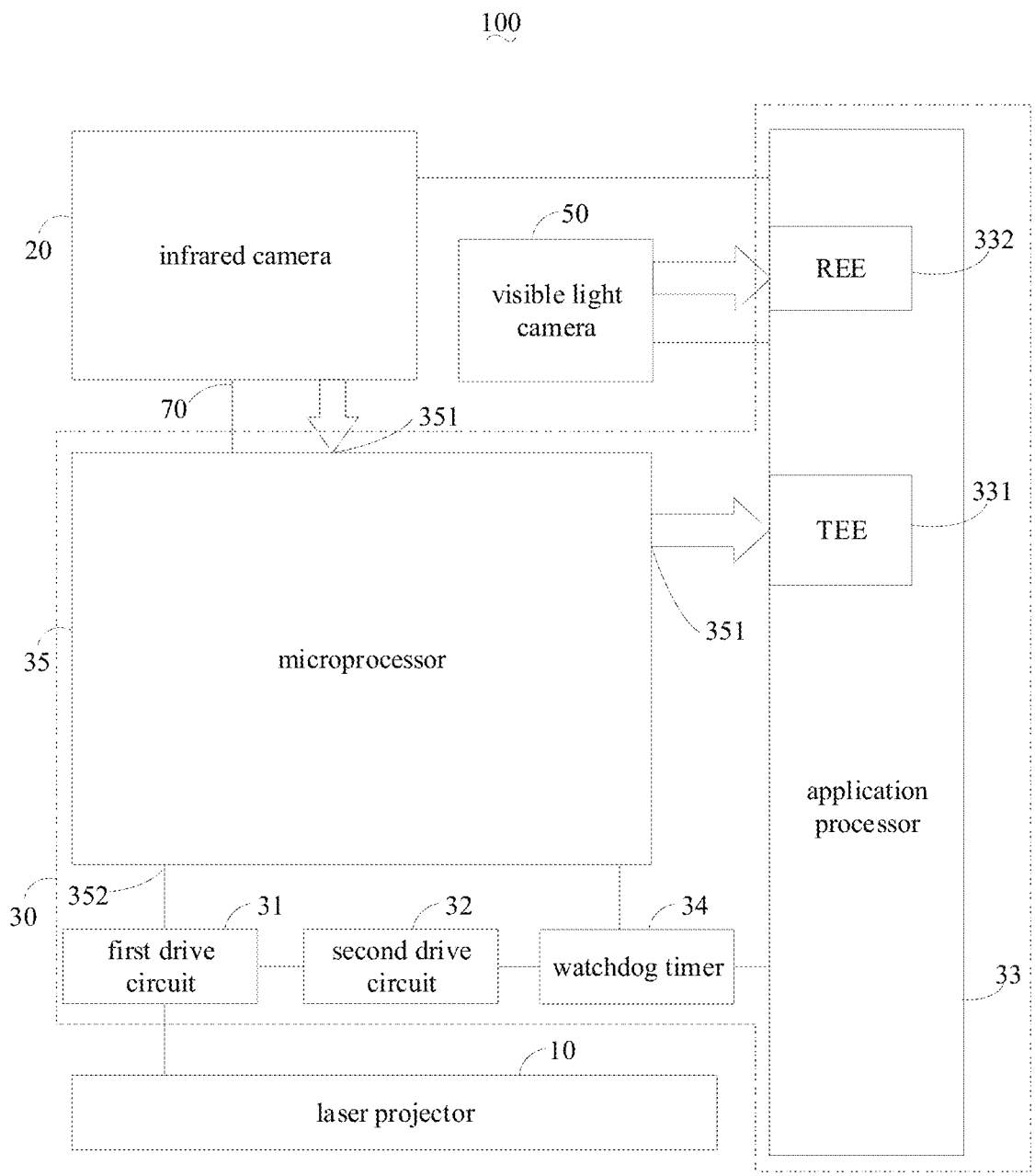
FIG. 4 illustrates a block diagram of a mobile terminal according to some embodiments of the present disclosure.

Referring to FIG. 4, in some embodiments, the first drive circuit 31 is also directly coupled to the microprocessor 35. In detail, the microprocessor 35 may be coupled to the first drive circuit 31 through a Pulse Width Modulation (PWM) interface 352. The first drive circuit 31 is further configured to send a timeout signal to the microprocessor 35 in response to that a duration of outputting the electrical signal is greater than or equal to a predetermined threshold. The microprocessor 35 is configured to stop sending the first predetermined signal to the watchdog timer 34 upon receiving the timeout signal. At this time, the watchdog timer 34 cannot receive the first predetermined signal within the first period. The watchdog timer 34 may power off the second drive circuit 32 to power off the first drive circuit 31 and the laser projector 10. Certainly, when receiving the timeout signal, the microprocessor 35 may also directly power off the first drive circuit 31 to power off the laser projector 10.

Figure 5:
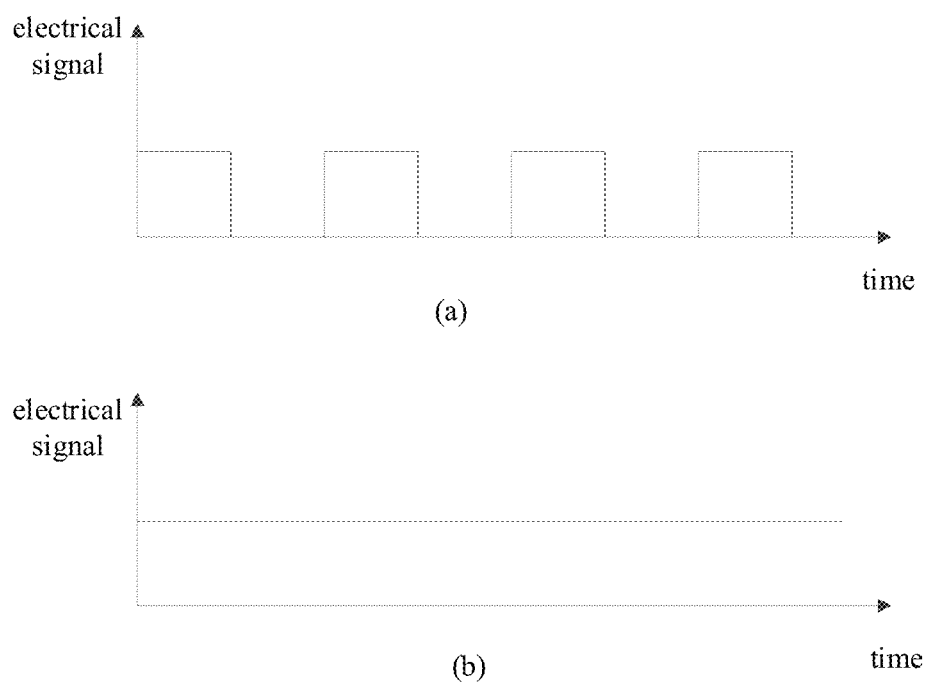
FIG. 5 illustrates a schematic diagram of a pulse wave signal output by a first drive circuit according to some embodiments of the present disclosure.

Referring to FIG. 5(*a*), when the first drive circuit 31 operates normally, the first drive circuit 31 outputs a pulse wave signal (for example, a square wave signal), such that the laser projector 10 continuously emits a plurality of frames of laser light. Referring to FIG. 5(*b*), when the first drive circuit 31 is malfunctioning, the first drive circuit 31 will keep outputting a high-level signal, such that the laser projector 10 continuously emits laser light outward. In order to prevent the laser projector 10 from continuously emitting laser light outward to damage the user, in the embodiment of the present disclosure, the laser projector 10 may be powered off by powering off the first drive circuit 31.

In detail, the first drive circuit 31 may be integrated with a timing function. The first drive circuit 31 may detect itself whether a duration of outputting the electrical signal is greater than or equal to the predetermined threshold. When the duration of outputting the electrical signal by the first drive circuit 31 is greater than or equal to the predetermined threshold, the first drive circuit 31 stops outputting the electrical signal to power off the laser projector 10. The predetermined threshold may be within a range of [3, 10] milliseconds. For example, the predetermined threshold may be set to 3 milliseconds, 4 milliseconds, 5 milliseconds, 6 milliseconds, 7 milliseconds, 8 milliseconds, 9 milliseconds, 10 milliseconds and any milliseconds within the above range.

In detail, when the laser projector 10 continuously emits laser light outward, that is, the duration of outputting the electrical signal by the first drive circuit 31 is greater than or equal to the predetermined threshold, the first drive circuit 31 may send the timeout signal to the microprocessor 35. When the microprocessor 35 receives the timeout signal from the first drive circuit 31, the microprocessor 35 stops sending the first predetermined signal to the watchdog timer 34. The watchdog timer 34 is configured to power off the second drive circuit 31 to power off the first drive circuit 31 and the laser projector 10 when the first predetermined signal is not received within the first period.

In the embodiment, the specific form of the watchdog timer 34 may be a counter. After the watchdog timer 34 receives the first predetermined signal, the watchdog timer 34 starts counting down at a certain speed from a number. If the first drive circuit 31 normally outputs the pulse wave signal, the microprocessor 35 resends the first predetermined signal before the number is counted down to reach 0, and the watchdog timer 34 resets the number after receiving the first predetermined signal. If the duration of outputting the electrical signal by the first drive circuit 31 is greater than or equal to the predetermined threshold, and the watchdog timer 34 counts to 0, the microprocessor 35 does not send the first predetermined signal, and the watchdog timer 34 is deemed to determine that the first drive circuit 31 is malfunctioning. A signal is sent by the watchdog timer 34 to power off the first drive circuit 31 to power off the laser projector 10.

Figure 6:
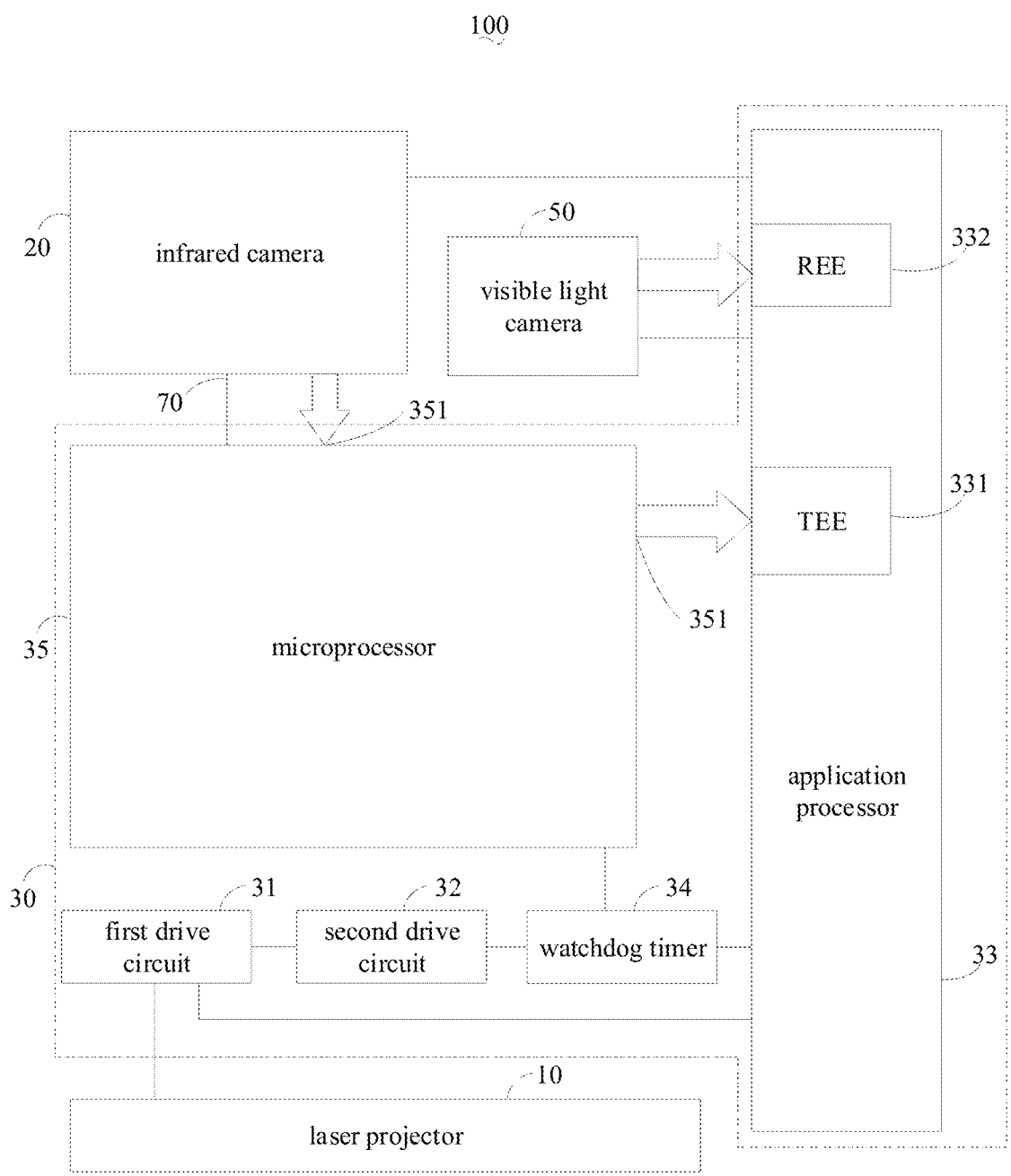
FIG. 6 illustrates a block diagram of a mobile terminal according to some embodiments of the present disclosure.

Referring to FIG. 6, in some embodiments, the first drive circuit 31 is also directly coupled to the application processor 33. In detail, the first drive circuit 31 is further configured to send a timeout signal to the application processor 33 in response to that a duration of outputting the electrical signal is greater than or equal to a predetermined threshold. The application processor 33 is configured to stop sending the second predetermined signal to the watchdog timer 34 upon receiving the timeout signal. At this time, the watchdog timer 34 cannot receive the second predetermined signal within the second period. The watchdog timer 34 may power off the second drive circuit 32 to power off the first drive circuit 31 and the laser projector 10. Certainly, when receiving the timeout signal, the application processor 33 may also directly power off the first drive circuit 31 to power off the laser projector 10.

In detail, when the laser projector 10 continuously emits laser light outward, that is, the duration of outputting the electrical signal by the first drive circuit 31 is greater than or equal to the predetermined threshold, the first drive circuit 31 may send the timeout signal to the application processor 33. When the application processor 33 receives the timeout signal from the first drive circuit 31, the application processor 33 stops sending the second predetermined signal to the watchdog timer 34. The watchdog timer 34 is configured to power off the second drive circuit 31 to power off the first drive circuit 31 and the laser projector 10 when the second predetermined signal is not received within the second period.

In the embodiment, the specific form of the watchdog timer 34 may be a counter. After the watchdog timer 34 receives the second predetermined signal, the watchdog timer 34 starts counting down at a certain speed from a number. If the first drive circuit 31 normally outputs the pulse wave signal, the application processor 33 resends the second predetermined signal before the number is counted down to reach 0, and the watchdog timer 34 resets the number after receiving the second predetermined signal. If the duration of outputting the electrical signal by the first drive circuit 31 is greater than or equal to the predetermined threshold, and the watchdog timer 34 counts to 0, the application processor 33 does not send the second predetermined signal, and the watchdog timer 34 is deemed to determine that the first drive circuit 31 is malfunctioning. A signal is sent by the watchdog timer 34 to power off the first drive circuit 31 to power off the laser projector 10.

Referring to FIG. 6, in some embodiments, the first drive circuit 31 is also directly coupled to the application processor 33. The first drive circuit 31 is further configured to stop outputting the electrical signal to the laser projector 10 to power off the laser projector 10 in response to that the duration of outputting the electrical signal is greater than or equal to the predetermined threshold.

In the system 30 provided in the present embodiment, it is determined that the first drive circuit 31 is malfunctioning when the duration of outputting the electrical signal by the first drive circuit 31 is greater than or equal to the predetermined threshold, the system 30 stops outputting the electrical signal through the first drive circuit 31 to the laser projector 10 to power off the laser projector 10, to prevents the laser projector 10 from continuously emitting laser light outward to damage the user.

Figure 7:
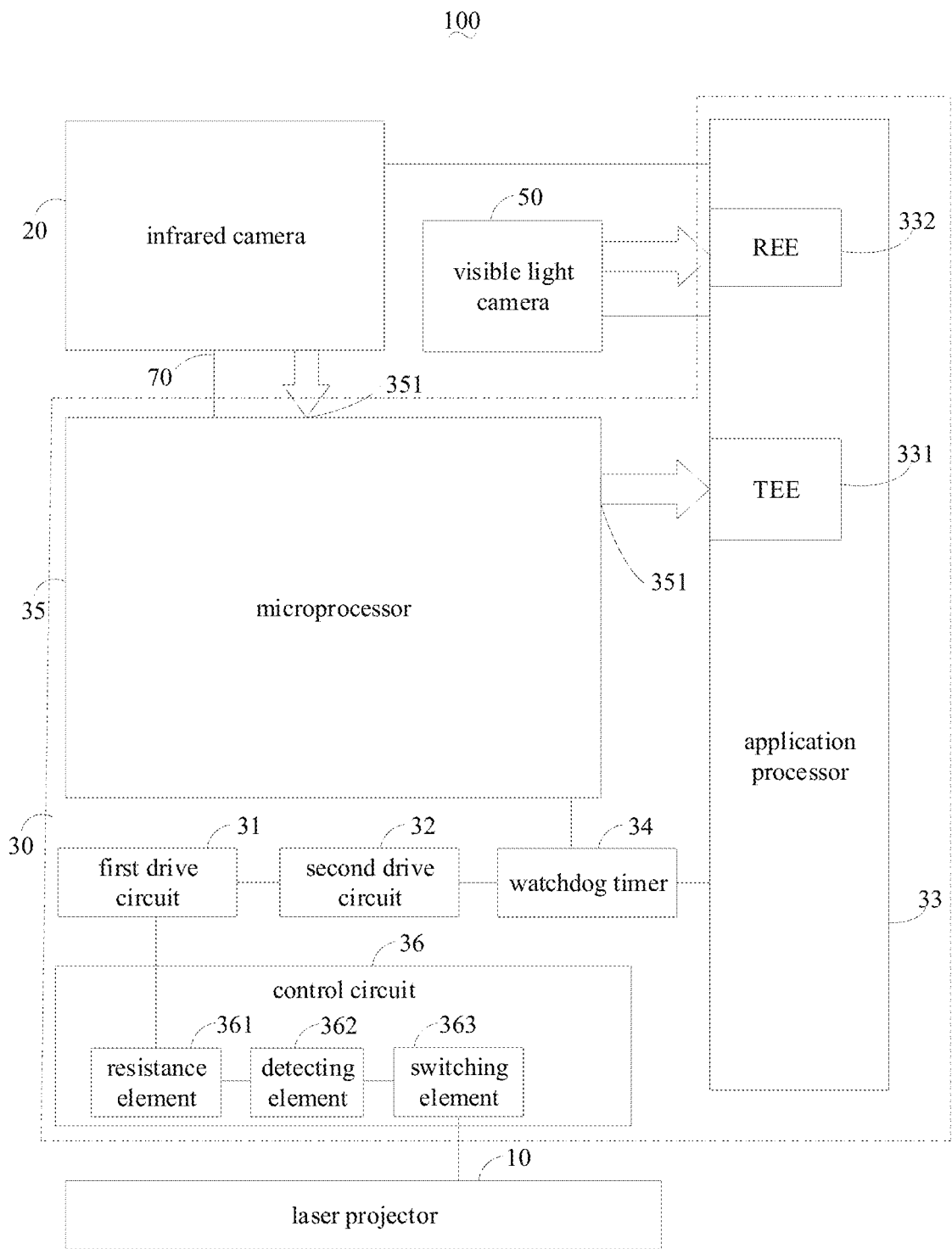
FIG. 7 illustrates a block diagram of a mobile terminal according to some embodiments of the present disclosure.

Referring to FIG. 7, in some embodiments, the system 30 further includes a control circuit 36. The control circuit 36 is coupled to the first drive circuit 31 and the laser projector 10. The control circuit 36 includes a resistance element 361, a detecting element 362 and a switching element 363. The detecting element 362 may be an ammeter. The detecting element 362 is coupled with the resistance element 361 and the first drive circuit 31 in series. The detecting element 362 is configured to detect a current flowing through the resistance element 361. The switching element 363 is coupled to the laser projector 10. The switching element 363 is configured to switch off the laser projector 10 when the current flowing through the resistance element 361 is greater than a preset current value.

In one example, when the first drive circuit 31 outputs an electrical signal to drive the laser projector 10 to project each frame of laser light, and the current output by the first drive circuit 31 is sequentially increased. For example, the current output by the first drive circuit 31 is increased from 100 mA to 200 mA. When the first drive circuit 31 is malfunctioning, the first drive circuit 31 keeps outputting a high-level signal, and the current may be increased continuously after increasing from 100 mA to 200 mA. At this time, the preset current value may be set to 220 mA. Since the resistance element 361 is coupled in series with the first drive circuit 31, the current flowing through the first drive circuit 31 is the current flowing through the resistance element 361. The switching element 363 is switched off when the current flowing through the resistance element 361 is greater than 220 mA to power off the laser projector 10.

Certainly, in other embodiments, the detecting element 362 may be a voltmeter. The detecting element 362 may be coupled to the resistance element 361 in parallel. The detecting element 362 is configured to detect a voltage across the resistance element 361. The switching element 363 is switched off to power off the laser projector 10 when the voltage across the resistance element 361 is greater than a preset voltage value, which is not described in detail here.

Figure 8:
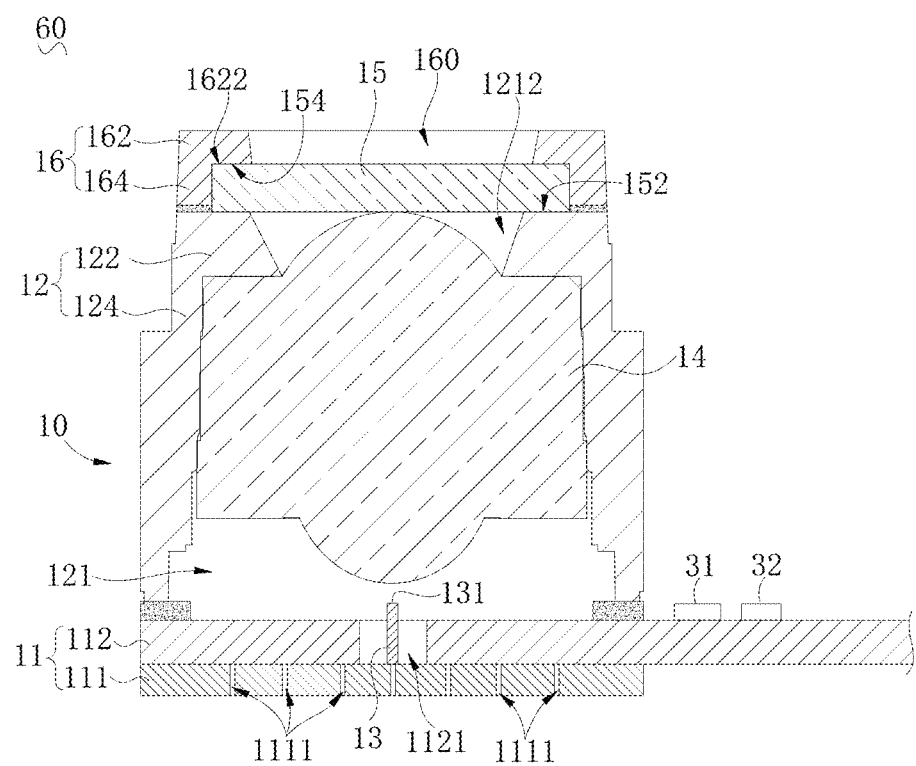
FIG. 8 illustrates a structure view of a laser projection assembly according to some embodiments of the present disclosure.

Referring to FIG. 8, in some embodiments, a laser projection assembly 60 is provided. The laser projection assembly 60 includes a laser projector 10, a first drive circuit 31, and a second drive circuit 32. The first drive circuit 31 and the second drive circuit 32 both may be integrated into a substrate assembly 11 of the laser projector 10.

Referring to FIG. 8, in some embodiments, the laser projector 10 includes a substrate assembly 11, a lens barrel 12, a light source 13, a collimating element 14, a diffractive optical element (DOE) 15, and a protective cover 16.

The substrate assembly 11 includes a substrate 111 and a circuit board 112. The circuit board 112 is disposed on the substrate 111. The circuit board 112 is configured to couple the e light source 13 and a main board of the mobile terminal 100. The circuit board 112 may be a hard board, a soft board or a soft and hard board. In the embodiment illustrated in FIG. 8, a through hole 1121 is formed in the circuit board 112. The light source 13 is fixed on the substrate 111 and electrically coupled to the circuit board 112. A heat dissipation hole 1111 may be formed on the substrate 111. The heat generated by the operation of the light source 13 or the circuit board 112 may be dissipated by the heat dissipation hole 1111. The heat dissipation hole 111 may be filled with a thermal adhesive, to further improve the heat dissipation performance of the substrate assembly 11.

The lens barrel 12 is fixedly coupled to the substrate assembly 11. The lens barrel 12 is formed with an accommodating cavity 121. The lens barrel 12 includes a top wall 122 and an annular peripheral wall 124 extending from the top wall 122. The peripheral wall 124 is disposed on the substrate assembly 11. The top wall 122 defines a light-passing hole 1212 communicating with the accommodating cavity 121. The peripheral wall 124 may be coupled to the circuit board 112 by glue.

The protective cover 16 is disposed on the top wall 122. The protective cover 16 includes a baffle 162 having a light-passing hole 160 and an annular side wall 164 extending from the baffle 162.

The light source 13 and the collimating element 14 are both disposed in the accommodating cavity 121. The diffractive optical element 15 is mounted on the lens barrel 12. The collimating element 14 and the diffractive optical element 15 are sequentially disposed on a light-emitting path of the light source 13. The collimating element 14 collimates the laser light emitted by the light source 13, and the laser light passes through the collimating element 14 and then passes through the diffractive optical element 15 to form a laser pattern.

Figure 9:
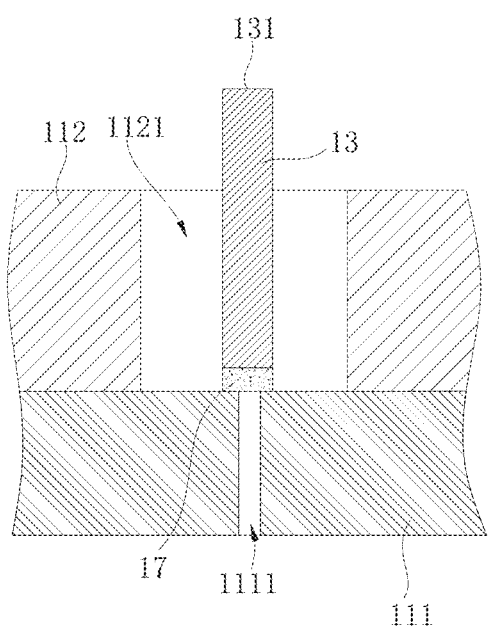
FIGS. 9 to 11 illustrates partial structure views of a laser projector according to some embodiments of the present disclosure.
Figure 10:
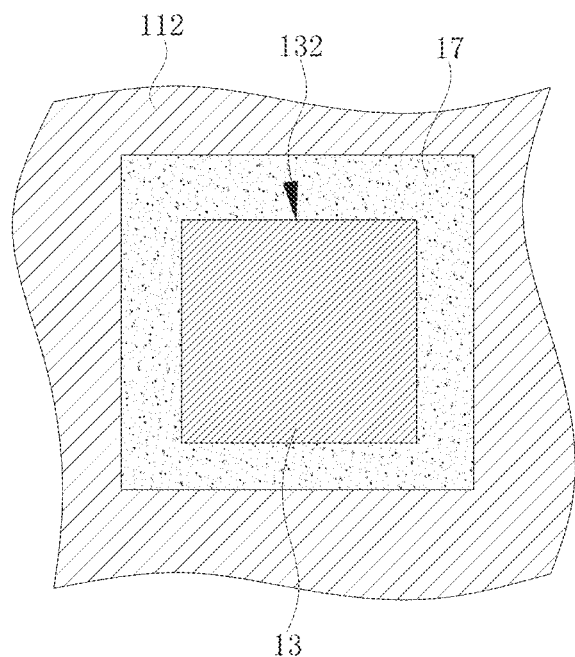

The light source 13 may be a Vertical Cavity Surface Emitting Laser (VCSEL) or an edge-emitting laser (EEL). In the embodiment illustrated in FIG. 8, the light source 13 is an edge-emitting laser. In detail, the light source 13 may be a Distributed Feedback Laser (DFB). The light source 13 is configured to emit laser light into the accommodating cavity 112. Referring to FIG. 9, the light source 13 is a columnar as a whole. One end surface of the light source 13, which is away from the substrate assembly 11, form a light-emitting surface 131. The laser light is emitted from the light-emitting surface 131. The light-emitting surface 131 faces the collimating element 14. The light source 13 is fixed on the substrate assembly 11. In detail, the light source 13 may be adhered to the substrate assembly 11 by a sealant 17. For example, a surface of the light source 13 opposite to the light-emitting surface 131 is attached to the substrate assembly 11. Referring to FIG. 8 and FIG. 10, one or more side surfaces 132 of the light source 13 may also be adhered to the substrate assembly 11. The sealing 17 encloses the surrounding side surfaces 132, or may only attach one side surface 132 to the substrate assembly 11, or a few side surfaces 132 to the substrate assembly 11. At this time, the sealant 17 may be a thermal conductive adhesive to conduct heat generated by the operation of the light source 13 into the substrate assembly 11.

Referring to FIG. 8, the diffractive optical element 15 is carried on the top wall 122 and housed in the protective cover 16. The opposite sides of the diffractive optical element 15 are respectively in contact with the protective cover 16 and the top wall 122. The baffle 162 includes an abutting surface 1622 adjacent to the light-passing hole 1212, and the diffractive optical element 15 is in contact with the abutting surface 1622.

In detail, the diffractive optical element 15 includes a diffraction incident surface 152 and a diffraction exit surface 154 which are opposite. The diffractive optical element 15 is carried on the top wall 122. The diffractive exit surface 154 is in contact with the surface (the abutting surface 1622) of the baffle 162 near the light-passing hole 1212, and the diffractive incident surface 152 is in contact with the top wall 162. The light-passing hole 1212 is aligned with the accommodating cavity 121. The light-emitting through-hole 160 is aligned with the light-passing hole 1212. The top wall 122, the annular side wall 164, and the baffle 162 are in contact with the diffractive optical element 15, thereby preventing the diffractive optical element 15 from falling out of the protective cover 16 in the light emission direction. In some embodiments, the protective cover 16 is adhered to the top wall 162 by glue.

The light source 13 of the laser projector 10 described above employs an edge-emitting laser. On the one hand, the temperature drift of the edge-emitting laser is smaller than that of the VCSEL array. On the other hand, since the edge-emitting laser is a single-point emitting structure, it is not necessary to design an array structure. The manufacturing is simple, and the light source of the laser projector 10 is low in cost.

When the laser light of the distributed feedback laser propagates, the gain of the power is obtained through the feedback of the grating structure. To increase the power of the distributed feedback laser, it is necessary to increase the injecting current and/or increase the length of the distributed feedback laser. Since increasing the injecting current will increase the power consumption of the distributed feedback laser and cause serious heat generation, in order to ensure the normal operation of the distributed feedback laser, it is necessary to increase the length of the distributed feedback laser, thus the distributed feedback laser usually has an elongate strip. When the light-emitting surface 131 of the edge-emitting laser faces the collimating element 14, the edge-emitting laser is placed vertically. Due to the structure of elongate strip of the edge-emitting laser, the edge-emitting laser is prone to accidents such as dropping, shifting or shaking. Therefore, by providing the sealant 17, the edge-emitting laser may be fixed to prevent accidents such as dropping, displacement or shaking of the edge-emitting laser.

Figure 11:
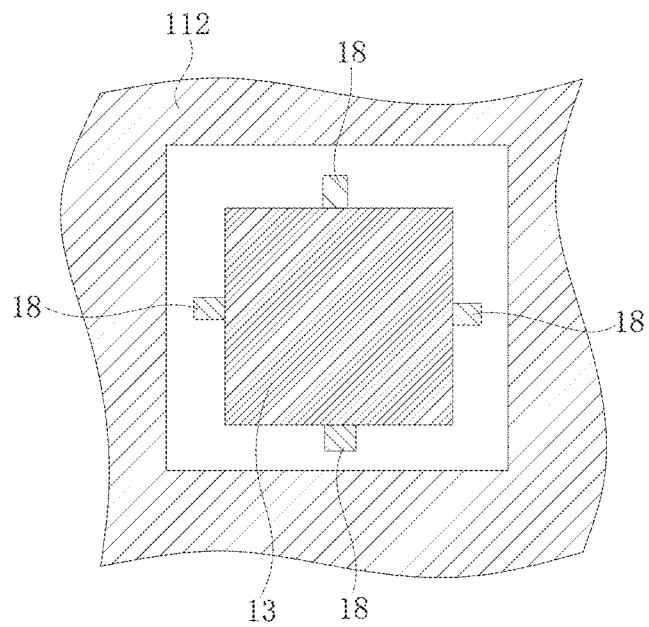

Refer to FIG. 8 and FIG. 11, in some embodiments, the light source 13 may also be fixed to the substrate assembly 11 in a fixed manner as illustrated in FIG. 11. In detail, the laser projector 10 includes a plurality of support members 18. The plurality of support members 18 may be fixed to the substrate assembly 11. The plurality of support members 18 collectively surround the light source 13. The light source 13 may be directly mounted among the plurality of support members 18. In one example, the plurality of support members 18 collectively clamp the light source 13 to further prevent the light source 13 from shaking.

In some embodiments, the protective cover 16 may be omitted. At this time, the diffractive optical element 15 may be disposed in the accommodating cavity 121. The diffraction exit surface 154 of the diffractive optical element 15 may be opposed to the top wall 122, and the laser light passes through the diffractive optical element 15 and then passes through the light-passing hole 1212. Thus, the diffractive optical element 15 is less likely to fall off.

In some embodiments, the substrate 111 may also be omitted. The light source 13 may be directly fixed to the circuit board 112 to reduce the thickness of the laser projector 10.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be converted in any suitable manner in one or more embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A system for controlling a laser projector, comprising:
a first drive circuit, coupled to the laser projector and configured to output an electrical signal to drive the laser projector to project laser light;
a second drive circuit, coupled to the first drive circuit and configured to supply power to the first drive circuit;
a watchdog timer, coupled to the second drive circuit;
a microprocessor, coupled to the watchdog timer and configured to send a first predetermined signal to the watchdog timer;
an application processor, coupled to the watchdog timer and configured to send a second predetermined signal to the watchdog timer; and
a control circuit, coupled to the first drive circuit and the laser projector, and comprising a resistance element, a detecting element and a switching element;
wherein the watchdog timer is configured to power off the second drive circuit to power off the first drive circuit and the laser projector, in response to that the watchdog timer does not read the first predetermined signal or the second predetermined signal;
wherein the detecting element is configured to perform one of the following:
detect a current flowing through the resistance element, and the switching element is configured to switch off to power off the laser projector in response to that the current is greater than a preset current; and
detect a voltage across the resistance element, and the switching element is configured to switch off to power off the laser projector in response to that the voltage is greater than a preset voltage value.

2. The system of claim 1, wherein the microprocessor is configured to send the first predetermined signal to the watchdog timer periodically at a first period; and
wherein the watchdog timer is configured to power off the second drive circuit to power off the first drive circuit and the laser projector, in response to that the watchdog timer does not receive the first predetermined signal within the first period.

3. The system of claim 2, wherein, the watchdog timer is configured to send a reset signal for restarting the microprocessor to the microprocessor, in response to that the watchdog timer does not receive the first predetermined signal within the first period.

4. The system of claim 2, wherein, the application processor is coupled to a control interface of the microprocessor, the control interface comprises an interface for restarting the microprocessor, and the watchdog timer is configured to send a reset signal for restarting the microprocessor to the application processor, in response to that the watchdog timer does not receive the first predetermined signal within the first period, and the application processor is configured to restart the microprocessor through the control interface of the microprocessor.

5. The system of claim 1, wherein the application processor is configured to send the second predetermined signal to the watchdog timer periodically at a second period; and
wherein the watchdog timer is configured to power off the second drive circuit to power off the first drive circuit and the laser projector, in response to that the watchdog timer does not receive the second predetermined signal within the second period.

6. The system of claim 5, wherein, the watchdog timer is configured to send a reset signal for restarting the application processor, in response to that the watchdog timer does not receive the second predetermined signal within the second period.

7. The system of claim 1, wherein the first drive circuit is configured to send a timeout signal to the microprocessor in response to that a duration of outputting the electrical signal is greater than or equal to a predetermined threshold; and
wherein the microprocessor is configured to stop sending the first predetermined signal to the watchdog timer upon receiving the timeout signal.

8. The system of claim 1, wherein the first drive circuit is configured to send a timeout signal to the application processor in response to that a duration of outputting the electrical signal is greater than or equal to a predetermined threshold; and
wherein the application processor is configured to stop sending the second predetermined signal to the watchdog timer upon receiving the timeout signal.

9. The system of claim 1, wherein, the first drive circuit is configured to stop outputting the electrical signal in response to that a duration of outputting the electrical signal is greater than or equal to a predetermined threshold.

10. A mobile terminal, comprising:
a laser projector; and
a system for controlling the laser projector, comprising:
a first drive circuit, coupled to the laser projector and configured to output an electrical signal to drive the laser projector to project laser light;
a second drive circuit, coupled to the first drive circuit and configured to supply power to the first drive circuit;
a watchdog timer, coupled to the second drive circuit;
a microprocessor, coupled to the watchdog timer and configured to send a first predetermined signal to the watchdog timer;
an application processor, coupled to the watchdog timer and configured to send a second predetermined signal to the watchdog timer; and
a control circuit, coupled to the first drive circuit and the laser projector, and comprising a resistance element, a detecting element and a switching element;
wherein the watchdog timer is configured to power off the second drive circuit to power off the first drive circuit and the laser projector, in response to that the watchdog timer does not read the first predetermined signal or the second predetermined signal;
wherein the detecting element is configured to perform one of the following:
detect a current flowing through the resistance element, and the switching element is configured to switch off to power off the laser projector in response to that the current is greater than a preset current; and
detect a voltage across the resistance element, and the switching element is configured to switch off to power off the laser projector in response to that the voltage is greater than a preset voltage value.

11. The mobile terminal of claim 10, wherein the microprocessor is configured to send the first predetermined signal to the watchdog timer periodically at a first period; and
wherein the watchdog timer is configured to power off the second drive circuit to power off the first drive circuit and the laser projector, in response to that the watchdog timer does not receive the first predetermined signal within the first period.

12. The mobile terminal of claim 11, wherein the watchdog timer is configured to send a reset signal for restarting the microprocessor to the microprocessor, in response to that the watchdog timer does not receive the first predetermined signal within the first period.

13. The mobile terminal of claim 11, wherein the application processor is coupled to a control interface of the microprocessor, the control interface comprises an interface for restarting the microprocessor, and the watchdog timer is configured to send a reset signal for restarting the microprocessor to the application processor, in response to that the watchdog timer does not receive the first predetermined signal within the first period, and the application processor is configured to restart the microprocessor through the control interface of the microprocessor.

14. The mobile terminal of claim 10, wherein the application processor is configured to send the second predetermined signal to the watchdog timer periodically at a second period; and
wherein the watchdog timer is configured to power off the second drive circuit to power off the first drive circuit and the laser projector, in response to that the watchdog timer does not receive the second predetermined signal within the second period.

15. The mobile terminal of claim 14, wherein the watchdog timer is configured to send a reset signal for restarting the application processor, in response to that the watchdog timer does not receive the second predetermined signal within the second period.

16. The mobile terminal of claim 10, wherein the first drive circuit is configured to send a timeout signal to the microprocessor in response to that a duration of outputting the electrical signal is greater than or equal to a predetermined threshold;
wherein the microprocessor is configured to stop sending the first predetermined signal to the watchdog timer upon receiving the timeout signal;
wherein the first drive circuit is configured to stop outputting the electrical signal in response to that the duration of outputting the electrical signal is greater than or equal to the predetermined threshold.

17. The mobile terminal of claim 10, wherein the first drive circuit is configured to send a timeout signal to the application processor in response to that a duration of outputting the electrical signal is greater than or equal to a predetermined threshold; and the application processor is configured to stop sending the second predetermined signal to the watchdog timer upon receiving the timeout signal;
wherein the first drive circuit is configured to stop outputting the electrical signal in response to that the duration of outputting the electrical signal is greater than or equal to the predetermined threshold.

18. The mobile terminal of claim 10, wherein:
the laser projector is capable of projecting laser light to a target object,
the mobile terminal further comprises an infrared camera capable of receiving laser pattern modulated by the target object;
the microprocessor is coupled to the infrared camera, the application processor, and the first drive circuit, and configured to process the laser pattern to obtain a depth image.

* * * * *